United States Patent Office 3,231,518
Patented Jan. 25, 1966

3,231,518
ATTRITION RESISTANT SILICEOUS CATALYSTS AND METHOD OF PREPARATION THEREOF
George L. Church, Paoli, Pa., assignor to Sun Oil Company, Philadelphia, Pa., a corporation of New Jersey
No Drawing. Filed July 9, 1964, Ser. No. 381,536
20 Claims. (Cl. 252—449)

This application is a continuation-in-part of application Serial No. 826,908, filed July 14, 1959, now abandoned.

This invention relates to a method of preparing solid catalysts which are highly resistant to attrition and to the catalyst so-produced.

The use of siliceous catalysts in hydrocarbon conversions, such as cracking, is well known. These catalysts may be used in processes such as fixed bed, moving bed or fluidized bed operations. In moving bed and fluidized bed operations, during the cracking step, the catalyst pellets generally move in a downwardly direction under the influence of gravity while contacting hydrocarbons which may be in liquid or gas phase, or in both liquid and gas phase. After passing through the cracking zone, the catalyst pellets are regenerated as by burning off carbon deposits and are then elevated, or lifted, so that they may again descend through the cracking zone. In some instances deactivated catalyst pellets are elevated to a regeneration zone located above the cracking zones. These lift operations may be mechanically performed, but gas lift operations wherein catalyst pellets are blown upwardly by means of a high velocity gas stream have many advantages. For example, flue gas flowing through a vertical conduit at high velocity can advantageously be used to elevate the catalyst particles.

In cracking operations as above described, wherein attritable catalyst pellets move through a cracking zone and are then elevated for another pass through the cracking zone, excessive catalyst attrition is a serious problem. This attrition occurs in the cracking zone, in the regeneration zone, during mechanical lift operations, and especially during gas lift operations, by the grinding action of the catalyst pellets against each other and against the confining surfaces of the apparatus. Catalyst attrition in some instances may be so severe as to render a cracking process uneconomical.

An object of the present invention is to provide solid catalyst pellets resistant toward attrition. A specific object is to provide a process for preparing siliceous catalyst pellets which are highly resistant toward attrition. A further object is to provide a process for the preparation of novel catalyst pellets especially effective for cracking hydrocarbons.

By "siliceous catalyst," as used herein, is meant a catalyst containing a major proportion of silica and which is known to exhibit activity toward cracking hydrocarbons. Synthetic catalysts such as silica-alumina, silica-magnesia, silica-zirconia, silica-alumina-magnesia and silica-vanadia catalysts, the preparation of which is well known, can be used in the present process with good results. Natural clays which may be acid activated such as fuller's earth, kaolin, the montmorillonite group including bentonite, and the like can also be used in the process of the invention.

It has now been found that by incorporating small particles of a material resistant to attrition at or near the surface of catalyst pellets, the grinding action normally experienced by the pellet surfaces is borne by the attrition-resistant particles so that loss of catalyst to catalyst fines is substantially reduced. These small particles are resistant to attrition by virtue of the fact that such particles are harder than the body of the catalyst pellets.

In an embodiment of the invention, relatively small particles formed of an attrition resistant material and which may be, for example, in the form of spheres are dispersed in a body of catalytic material maintained in a plastic condition. The catalytic material is then molded, extruded or otherwise formed into pellets and hardened. The quantity and size of the dispersed attrition resistant particles are such that they contact like particles similarly located in other catalyst pellets, or the surfaces of the confining apparatus, when used in catalytic operations, so that the overall attrition of the catalyst pellets is substantially reduced.

In another embodiment of the invention, attrition resistant spheres, as above described, are impressed into the surface of plastic catalytic bodies, such as pellets, prior to final hardening. In this embodiment, the volume of the spheres does not substantially alter the volume of catalyst available for the cracking process.

Materials which can be used as the attrition resistant particles preferably have substantially the same coefficient of expansion as the catalyst in order to prevent fracturing of the pellet during temperature changes. The materials used may be inert or exert some catalytic influence on the reaction, but should not have a substantial deleterious effect, such as increasing coke formation or giving an undesired product distribution in a hydrocarbon cracking process.

In a preferred embodiment, the attrition resistant material is composed of the same material as the catalyst, but is hardened, as by heating to a substantial temperature or by other means, prior to incorporation in the catalyst. Such attrition resistant particles are generally relatively inert toward the catalytic reaction and hence exhibit no deleterious effects, and have substantially the same coefficient of expansion as the catalyst so that fracturing of the catalyst particles due to temperature changes is minimized. A further advantage is that, when the catalyst pellet containing the attrition resistant particles are calcined at the usual temperatures, a firm bond between the catalyst and particles is formed. In effect, the resulting catalyst pellet has zones of hardness rather than discrete, incorporated particles.

By regulating the calcining conditions the relative hardness or resistance to attrition of the catalyst pellet may be regulated. Generally the higher the temperature and the longer for the time of heating will produce a catalyst pellet which has greater attrition resistance (less attritable) than catalyst pellets which have been subjected to lower temperatures and shorter times of heating during the calcining step. However, in this preferred embodiment, when heating the catalytic material for conversion to attrition resistant material, it is important that the temperature and time of heating in the hardening process be regulated so that at least some attrition of the resulting catalytic composition will be observed. This attrition is necessary in order to maintain good catalytic activity by removing catalyst poisons from the surface. The temperature and time of exposure can be regulated so that the resulting catalytic composition exhibits an optimum amount of attrition, i.e., a balance between minimizing attrition to prevent loss of catalyst to catalyst fines, and permitting enough attrition to maintain catalytic activity. The exact temperatures and times to employ will vary according to the material in use and such conditions can be readily determined in light of the present teachings and specific embodiments given hereinafter, but generally temperatures of from about 800° C. to 1500° C. for from 0.5 to 10 hours will be used. In addition to regulating the attrition rate, the temperature and time of heating the particles, or the material from which the particles are prepared, can be regulated to effect an advantageous change in the final catalyst pellets, such as by decreasing cracking activity to lessen coke formation in cracking operations. Also, the hardening step can be performed in a particular atmosphere, such as air, steam, nitrogen, mixtures thereof and the like to give a desired result. For example, hardening in a steam atmosphere gives a relatively inert material, and permits the hardening to be performed at a relatively low temperature, such as from 800° C. to 950° C.

The attrition resistant particles can be formed of materials other than the material of the catalyst, and advantageously may be formed of a noncatalytic material. For example, glass particles can be used with good results. In using glass particles, it is advantageous to select a glass having substantially the same coefficient of expansion as the catalyst in order to minimize fracturing. Other materials can also be used, such as fused alumina, silica, quartz, ceramic materials such as hardened clays, and the like. When the catalyst is to be used in a catalytic process including a gas lift operation, the added attrition resistant particles preferably should not change the density of the catalyst pellets to a substantial degree, i.e., the density of the particles should not be increased so as to make the gas lift operation difficult.

Although the particles are advantageously in the form of spheres, other forms, including irregularly shaped particles, give good results. The size of the particles can vary substantially, depending on the size of the final catalyst pellet and whether the particles are dispersed throughout the catalyst pellets or impressed into the surface thereof. The particle size is relatively small compared to the catalyst pellet size and may vary, for example, from about 0.5 to 2.5 mm. in average diameter, but to obtain operable results, the particles must be discrete and not powdery. The final new catalyst pellets will usually vary in size from about 4 to 15 mm. in average diameter, and may be in any desired shape, such as spheres, cylinders, or the like. Preferably the average diameter of the pellets is from about 5 to 10 times the average diameter of the particles used. The number of particles to incorporate in the catalyst pellets, when the particles are dispersed therethrough, should be such that the ratio of the average distance between adjacent edges of the particles to the average particle diameter is from about 0.3 to 0.8, and when the particles are impressed into the surface of the catalyst pellets, the spacing should be such that the same ratio applies. In preparing catalyst pellets having the attrition resistant particles spaced therethrough, it is convenient to add a measured volume of particles to a known volume of plastic catalyst mix to give the above stated ratio. Advantageously about 18%, say from about 12% to 25% by volume, of particles having a size as above defined is added to a catalyst mix, the percent by volume being based on the volume of final catalyst prepared from the mix, i.e., from about 12% to 25% by volume of the final catalyst should be occupied by the particles, but more or less can be used on occasion with good results.

The attrition resistant particles can be incorporated into the catalyst at any point in its manufacture when the catalyst is in a plastic, or fluid, state. When the particles are to be dispersed throughout the catalyst pellets, they are added to the catalyst mix prior to extrusion, molding, or otherwise forming into final shape, while the catalyst is in a plastic or fluid state so that a uniform dispersion can be obtained. For example, with synthetic catalysts, the particles are advantageously added to and dispersed throughout silica hydrogel, or a plural gel formed by coprecipitation, and such dispersion can be before or after the addition of other components, such as aluminum nitrate, required to give the final desired catalyst. With natural catalysts such as clay, the particles are advantageously added to a thick aqueous slurry, or paste, thereof and the resulting mixture formed into the desired shape and dried. Other means of incorporating the particles in the catalyst may be employed, such as by precipitation of one or more components of the catalyst mix, such as silica hydrogel, in a dispersion of the particles. When the particles are impressed into the surface of the catalyst pellets, mechanical pressure is employed preferably immediately after formation, and before hardening, of the pellets.

The efficacy of the present invention can be demonstrated by comparing size reduction of the catalyst pellets of the invention with the size reduction of equivalent pellets, except not having hard particles therein, when rotated under the same conditions in a ball mill. As illustrative of suitable conditions for the ball mill test, 60 grams of catalyst pellets are placed in a cylindrical ball mill 3.5 inches in diameter and 3¾ inches long with 8 steel balls 1⁵⁄₁₆ inch in diameter weighing 50 grams each. The mill is then rotated at 80 revolutions per minute for a time sufficient to reduced in size enough catalyst for accurate measurement, say from 1 to 8 hours. When catalyst pellets made as heretofore described of a size held on a certain size sieve, say a 2½ mesh sieve (U.S. Sieve Series) are subjected to attrition in a ball mill until a certain percent, say 30% by weight, passes through a larger numbered sieve, say a 5 mesh sieve, and the ball milling repeated under the same conditions, including the same time of rotation, with equivalent catalyst pellets except that relatively hard particles are incorporated therein in accordance with the invention, no more than about one half the amount obtained with the other catalyst, in this instance no more than 15% by weight, passes through the 5 mesh sieve.

In order to illustrate an embodiment of the invention, to acid activated montmorillonite clay suitable for forming into pellets useful in promoting hydrocarbon cracking is added water to make a thick paste. Pellets about 10 mm. in diameter are formed from the paste and heated at about 950° C. in air for about 6 hours. This treatment produces hard pellets of greatly decreased catalytic activity. The so-treated pellets are crushed and the resulting particles having an average diameter of about 1 mm. separated. To an additional quantity of the same acid activated montmorillonite, about 1 liter, is added water to make a thick paste. The hard, separated particles prepared as above described are dispersed throughout the paste the quantity used being sufficient to occupy 18% of the volume of the final catalyst pellets. The resulting composition is extruded to form catalyst pellets in the shape of cylinders about 10 mm. long and 5 mm. in diameter, and calcined at about 300° C. for 4 hours. The resulting catalyst pellets show excellent activity for cracking hydrocarbons, having an activity index (Alexander, Proceedings American Petroleum Institute 27 (III), 51 (November, 1947) of about 28, substantial resistance to attrition, no difficulty due to fracturing under temperature changes being observed. For comparison, catalyst pellets prepared in an identical manner but without incorporation of the attrition resistant particles have only a slightly higher catalytic activity, but substantially reduced resistance to attrition. When tested for attrition by ball milling as above described, when 20% by weight passes a 5 mesh sieve, only about 8% by weight of the catalyst of the invention passes the 5 mesh sieve.

To illustrate a further embodiment of the invention, to a silica hydrogel prepared in the usual manner by stirring a 25° Bé. sodium silicate solution into an equal volume of 23° Bé. sulfuric acid, allowing the gel to set up and then breaking up and washing the gel, is added sufficient aluminum nitrate solution to give a $SiO_2:Al_2O_3$ ratio of 8:1. The gel is drained and separated into two parts.

A portion of the separated gel is formed into spheres about 5 mm. in diameter and heated to about 1000° C. in air for about 5 hours. The spheres are then crushed and the particles having an average diameter of 0.6 mm. separated. These particles are hard and relatively noncatalytic. The so-formed hard particles are incorporated into the remaining portion of the drained gel, which is as a thick paste, by mechanical stirring, the quantity of the particles being such as to form about 15% by volume of the final catalyst. The dispersion is then molded into spheres having a diameter of about 8 mm. and calcined at about 760° C. in an atmosphere of steam to decrease the activity level to an activity index of about 44. For comparison, when a silica-alumina catalyst is prepared in the same manner, but without the addition of the attrition resistant particles, the activity index thereof is about 46. When tested for attrition by ball milling as above described, when 25% by weight of the latter catalyst passes a 5 mesh sieve, only about 10% by weight of the former catalyst, the catalyst of the invention, passes the 5 mesh sieve.

The foregoing embodiments illustrate the process and compositions of the present invention. Similar results are obtained when attrition resistant particles, such as glass particles, are used instead of the particles formed from the same catalytic material as the final catalyst. Other means of incorporating the attrition resistant particles in catalyst pellets will be apparent to those skilled in the art. The catalyst pellets of the invention are especially useful in processes for cracking hydrocarbons to lower molecular weight hydrocarbons, but are also useful in other processes such as hydrogenation, dehydrogenation, isomerization and the like.

The invention claimed is:

1. A catalyst pellet of from 4 to 15 mm. in average diameter consisting essentially of attritable siliceous catalytic material having particles of a greater hardness than said attritable siliceous catalytic material positioned in said pellet adjacent to surface thereof; said particles having an average diameter of at least 0.5 mm.

2. A catalyst pellet according to claim 1 wherein said particles are positioned throughout the body of said pellet.

3. A catalytic pellet according to claim 1 wherein said particles are formed of substantially the same material as said catalytic material.

4. A catalytic pellet according to claim 1 wherein said particles are formed of a noncatalytic material.

5. A catalytic pellet according to claim 1 wherein said particles are formed of glass.

6. A pelleted catalyst composition consisting essentially of:
   (1) a major proportion of attritable siliceous material having catalytic activity, and
   (2) a minor proportion of relatively noncatalytic less attritable discrete particles having an average diameter of at least 0.5 mm. and selected from the group consisting of:
      (a) previously hardened and relatively noncatalytic siliceous material,
      (b) glass,
      (c) fused alumina,
      (d) quartz,
      (e) silica,
      (f) ceramic materials.

7. A pelleted catalyst composition according to claim 6 wherein said particles are previously hardened and relatively noncatalytic siliceous material.

8. A pelleted catalyst composition according to claim 6 wherein said particles are glass.

9. A pelleted catalyst composition according to claim 6 wherein said minor proportion is between 12% and 25% by volume.

10. A pelleted catalyst composition consisting essentially of:
    (1) a major proportion of attritable activated natural clay having catalytic activity; and
    (2) a minor proportion of relatively noncatalytic less attritable discrete particles having an average diameter of at least 0.5 mm. and selected from the group consisting of:
       (a) previously hardened and relatively noncatalytic activated natural clay,
       (b) glass,
       (c) fused alumina,
       (d) quartz,
       (e) silica,
       (f) ceramic materials.

11. A pelleted catalyst composition according to claim 10 wherein said particles are previously hardened and relatively noncatalytic activated natural clay.

12. A pelleted catalyst composition according to claim 10 wherein said particles are glass.

13. A pelleted catalyst composition according to claim 10 wherein said minor proportion is between 12% and 25% by volume.

14. A catalyst pellet of from 4 to 15 mm. in average diameter comprising the composition according to claim 9.

15. A catalyst pellet of from 4 to 15 mm. in average diameter comprising the composition according to claim 13.

16. A catalyst pellet of from 4 to 15 mm. in average diameter consisting essentially of a siliceous catalyst pellet having catalytic activity, having specified attrition resistance and having relatively noncatalytic discrete particles composed of siliceous material which has greater attrition resistance than the hereinabove specified attrition resistance positioned adjacent the surface of the pellet; said particles having an average diameter of from 0.5 to 2.5 mm. whereby the ratio of the average distance between adjacent edges of the particles to the average diameter of the particles is from 0.3 to 0.8.

17. A catalyst pellet of from 4 to 15 mm. in average diameter consisting essentially of an activated natural clay having catalytic activity, having specified attrition resistance and having relatively noncatalytic discrete particles composed of activated natural clay which has greater attrition resistance than the hereinabove specified attrition resitance positioned adjacent the surface of the pellet; said particles having an average diameter of from 0.5 to 2.5 mm. whereby the ratio of the average distance between adjacent edges of the particles to the average diameter of the particles is from 0.3 to 0.8.

18. Process for the preparation of attrition resistant catalyst composition which comprises the steps of:
    (1) heating particulate catalytic material to an elevated temperature and for a period of time such that the said material is rendered relatively noncatalytic and has greater hardness than the hereinafter specified hardness; and,
    (2) incorporating said materials as discrete particles having an average particle diameter of at least 0.5 mm. into attritable siliceous material having catalytic activtity and having specified hardness in an amount sufficient to render the catalyst composition attrition resistant.

19. Process according to claim 18 wherein said sufficient amount is between 12% and 25% by volume of the composition.

20. Process for the preparation of attrition resistant catalyst composition which comprises incorporating from 12% to 25% by volume of relatively noncatalytic discrete particles having an average particle diameter of from 0.5 to 2.5 mm. and having a greater hardness than the hereinafter specified hardness into siliceous material having catalytic activity and specified hardness.

References Cited by the Examiner

UNITED STATES PATENTS

| | | | |
|---|---|---|---|
| 2,487,065 | 11/1949 | Milliken | 252—455 |
| 2,935,483 | 5/1960 | Schwartz | 252—455 |
| 2,964,481 | 12/1960 | Cramer et al. | 252—455 |
| 3,023,172 | 2/1962 | Innes et al. | 252—455 |

MAURICE A. BRINDISI, *Primary Examiner.*